United States Patent
Kuroda et al.

US006756127B2

(10) Patent No.: US 6,756,127 B2
(45) Date of Patent: Jun. 29, 2004

(54) PRIMER COMPOSITION FOR SILICONE PRESSURE-SENSITIVE ADHESIVES

(75) Inventors: Yasuyoshi Kuroda, Gunma-ken (JP); Shunji Aoki, Gunma-ken (JP); Masahiko Ogawa, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/269,001

(22) Filed: Oct. 11, 2002

(65) Prior Publication Data

US 2003/0104224 A1 Jun. 5, 2003

Related U.S. Application Data

(62) Division of application No. 09/805,942, filed on Mar. 15, 2001, now Pat. No. 6,559,246.

(30) Foreign Application Priority Data

Mar. 23, 2000 (JP) .......................................... 2000-082938

(51) Int. Cl.⁷ ......................... B32B 25/20; C08G 77/12; C08G 77/20
(52) U.S. Cl. .................. 428/447; 428/448; 525/476; 525/477; 525/478; 528/15; 528/26.5; 528/31; 528/32; 524/588
(58) Field of Search .................. 428/447, 448; 525/476, 477, 478; 528/15, 26.5, 31, 32; 524/588

(56) References Cited

U.S. PATENT DOCUMENTS

| | | | |
|---|---|---|---|
| 4,082,726 A | 4/1978 | Mine et al. | |
| 4,246,038 A | 1/1981 | Vaughn, Jr. et al. | |
| 4,322,320 A | 3/1982 | Caprino | |
| 4,565,714 A * | 1/1986 | Koshar | 427/515 |
| 5,034,061 A | 7/1991 | Maguire et al. | |
| 5,264,278 A * | 11/1993 | Mazurek et al. | 428/317.3 |
| 5,384,075 A | 1/1995 | Okami | |
| 5,529,837 A | 6/1996 | Fujiki et al. | |
| 6,204,350 B1 * | 3/2001 | Liu et al. | 528/23 |
| 6,207,769 B1 | 3/2001 | Gerlach et al. | |
| 6,251,990 B1 | 6/2001 | Meguriya et al. | |
| 6,406,793 B1 * | 6/2002 | Aoki | 428/447 |
| 6,407,195 B2 * | 6/2002 | Sherman et al. | 528/28 |
| 6,559,246 B2 * | 5/2003 | Kuroda et al. | 525/478 |

FOREIGN PATENT DOCUMENTS

| | | |
|---|---|---|
| DE | 43 30 605 A1 | 3/1994 |
| EP | 0 699 717 A2 | 3/1996 |
| GB | 2 270 522 A | 3/1994 |
| JP | 54-44017 B2 | 12/1979 |
| JP | 6-39584 B2 | 5/1994 |

OTHER PUBLICATIONS

Machine Translation of JP 08–183934, Satou et al. 07–1996, obtained from the JPO website.*

* cited by examiner

*Primary Examiner*—Jeffrey B. Robertson
(74) *Attorney, Agent, or Firm*—Birch, Stewart, Kolasch & Birch, LLP

(57) ABSTRACT

A primer composition comprising (A) a diorganopolysiloxane having an average degree of polymerization of 500–2,000 and alkenyl groups at both ends of its molecular chain in an amount of 0.001–0.005 mol per 100 g of the diorganopolysiloxane, (B) an organohydrogenpolysiloxane having at least two SiH groups in a molecule, (C) a platinum base curing catalyst, and (D) a retarder is effective for improving the adhesion between various plastic films and silicone pressure-sensitive adhesives and thus forming satisfactory pressure-sensitive adhesive tapes.

17 Claims, No Drawings

PRIMER COMPOSITION FOR SILICONE PRESSURE-SENSITIVE ADHESIVES

This application is a divisional of application Ser. No. 09/805,942, filed on Mar. 15, 2001, now U.S. Pat. No. 6,559,246 the entire contents of which are hereby incorporated by reference and for which priority is claimed under 35 U.S.C. § 120; and this application claims priority of Application No. 2000-082938 filed in Japan on Mar. 23, 2000 under 35 U.S.C. § 119.

This invention relates to a primer composition for silicone pressure-sensitive adhesives, and more particularly, to a primer composition for use in a pressure-sensitive adhesive tape for providing a firm bond between a plastic film and a silicone pressure-sensitive adhesive layer thereon.

BACKGROUND OF THE INVENTION

Prior art heat resistant pressure-sensitive adhesive tape typically includes a plastic film backing such as polyester film or polyimide film on which a heat resistant, silicone pressure-sensitive adhesive is applied to form an adhesive layer. The pressure-sensitive adhesive tape is generally wound into a roll form. When the adhesive tape is forcedly unraveled on use, the silicone pressure-sensitive adhesive layer can sometimes be stripped from the backing. Also when the adhesive tape is cut, it sometimes happens that only the backing is torn off, but the silicone pressure-sensitive adhesive layer remains uncut and becomes stretched with strings being drawn. Sometimes the adhesive layer is partially separated apart from the backing.

Such problems arise on use of the pressure-sensitive adhesive tape because the adhesion between the plastic film backing and the silicone pressure-sensitive adhesive is not fully tight. One common solution employed heretofore is to apply a carbon functional silane-based primer composition to a film backing as an adhesion improver, then applying a silicone pressure-sensitive adhesive thereon, for thereby improving the adhesion between the film backing and the silicone pressure-sensitive adhesive. However, the adhesion achieved thereby was not satisfactory.

A number of primer compositions using organopolysiloxane have been proposed for helping silicone pressure-sensitive adhesives firmly bond to plastic films. For example, JP-B 54-44017 discloses a primer composition comprising a diorganopolysiloxane having hydroxyl groups at both ends of its molecular chain, an organohydrogenpolysiloxane, and a tin salt of organic carboxylic acid. JP-B 6-39584 discloses a primer composition comprising a diorganopolysiloxane having hydroxyl groups at both ends of its molecular chain, an organohydrogenpolysiloxane, a vinyl and/or acrylic copolymer containing hydrolyzable silyl groups, and a tin salt of organic carboxylic acid.

These primer compositions, however, sometimes fail to provide a satisfactory bond. For example, in the event of addition curing type silicone pressure-sensitive adhesives which are recently on use and to be cured at lower temperatures, it is more difficult to provide a firm bond between the pressure-sensitive adhesive and the backing. This is true especially when the backing is of polyimide film having better heat resistance. It is thus desired to have a primer composition capable of forming a tight bond therebetween.

Therefore, an object of the invention is to provide a primer composition capable of forming a tight bond between various film backings and silicone pressure-sensitive adhesives.

SUMMARY OF THE INVENTION

The invention pertains to a primer composition comprising an alkenyl group-containing organopolysiloxane, an organohydrogenpolysiloxane, a platinum base curing catalyst, and a retarder. It has been found that the objects are achieved when the alkenyl group-containing organopolysiloxane is a diorganopolysiloxane having an average degree of polymerization of 500 to 2,000 and alkenyl groups at both ends of its molecular chain in an amount of 0.001 to 0.005 mol per 100 g of the diorganopolysiloxane.

When various plastic film backings are treated with this primer composition, and silicone pressure-sensitive adhesives are applied thereto, very tight bonds are established between the backings and the adhesives. This is true even when the plastic film backings are polyimide films which are believed difficult to establish a tight bond with silicone pressure-sensitive adhesives, and also when the adhesives are addition curing type silicone pressure-sensitive adhesives. As a consequence, satisfactorily heat resistant pressure-sensitive adhesive tapes are obtained.

Accordingly, the invention provides a primer composition for silicone pressure-sensitive adhesives, comprising (A) a diorganopolysiloxane having alkenyl groups at both ends of its molecular chain and an average degree of polymerization of 500 to 2,000, the amount of alkenyl groups being 0.001 to 0.005 mol per 100 g of the diorganopolysiloxane, (B) an organohydrogenpolysiloxane having at least two hydrogen atoms directly attached to silicon atoms in a molecule, (C) a platinum base curing catalyst, and (D) a retarder.

In one preferred embodiment, the primer composition further includes (E) an organopolysiloxane having at least one epoxy group-containing organic group, at least one hydrogen atom, and at least one alkoxysilyl group-containing alkyl group, each directly attached to a silicon atom, in a molecule and/or (F) at least one additive selected from among a fatty acid, an acid anhydride resulting from intermolecular condensation thereof, and an intramolecular acid anhydride thereof.

DESCRIPTION OF THE PREFERRED EMBODIMENT

In the primer composition for silicone pressure-sensitive adhesives according to the invention, component (A) is a diorganopolysiloxane having alkenyl groups at both ends of its molecular chain and an average degree of polymerization of 500 to 2,000, the amount of alkenyl groups being 0.001 to 0.005 mol per 100 g of the diorganopolysiloxane. The preferred diorganopolysiloxane is of the following general formula (1).

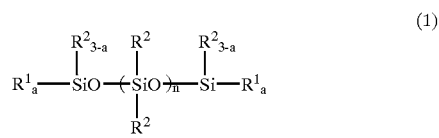

Herein $R^1$ is alkenyl, $R^2$ is a substituted or unsubstituted monovalent hydrocarbon group, "a" is an integer of 1 to 3, and n is from 500 to 2,000.

Preferably R¹ stands for alkenyl groups of 2 to 8 is carbon atoms, such as vinyl, allyl and butenyl, with vinyl being most preferred. R² stands for substituted or unsubstituted monovalent hydrocarbon groups of 1 to 16 carbon atoms, especially 1 to 8 carbon atoms, for example, alkyl groups such as methyl, ethyl, propyl, butyl and octyl, cycloalkyl groups such as cyclohexyl, alkenyl groups such as vinyl and allyl, aryl groups such as phenyl and tolyl, and aralkyl groups such as benzyl and phenethyl, and substituted groups in which some or all of the hydrogen atoms on the foregoing groups are replaced by halogen atoms, cyano groups or the like, for example, haloalkyl groups such as chloropropyl and trifluoropropyl. Of these, methyl and phenyl are preferred for the industrial use.

The diorganopolysiloxane having alkenyl groups at both ends of its molecular chain represented by formula (1) has an average degree of polymerization of 500 to 2,000 and alkenyl groups in an amount of 0.001 to 0.005 mol per 100 g of the diorganopolysiloxane. Preferably, the average degree of polymerization is from 1,000 to 2,000 and the amount of alkenyl groups is from 0.001 to 0.0025 mol per 100 g of the diorganopolysiloxane. With an average degree of polymerization of less than 500, the primer composition in the cured state is likely to strip from the film surface, failing to exert its effects. An average degree of polymerization of at least 500 prevents stripping and ensures primer effects. With an average degree of polymerization of 1000 to 2,000, the primer composition forms a more tight bond. An average degree of polymerization of more than 2,000 aggravates the adhesion between the pressure-sensitive adhesive and the backing. If the molar amount of alkenyl groups is less than 0.001 mol per 100 g of the diorganopolysiloxane, the primer composition will not cure. In excess of 0.005 mol/100 g, the primer effects are restrained.

The organohydrogenpolysiloxane (B) serves as a crosslinking agent to component (A) such that hydrogen atoms directly attached to silicon atoms (SiH groups) in component (B) undergo hydrosilylation reaction with alkenyl groups in component (A) for curing. The organohydrogenpolysiloxane (B) is not critical as long as it has at least two hydrogen atoms directly attached to silicon atoms (SiH groups) per molecule. Illustrative examples are represented by the following general formulas (2) to (4).

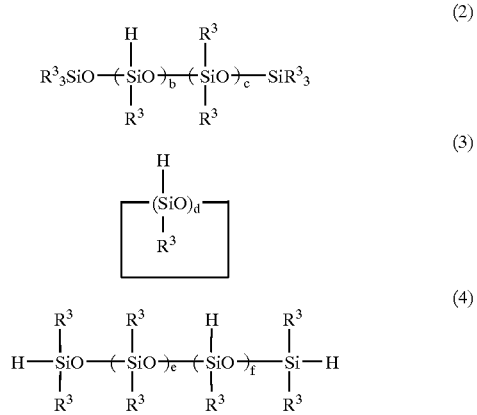

In the formulas, R³ is a substituted or unsubstituted monovalent hydrocarbon group, b is an integer of at least 2, d is an integer of at least 3, each of c, e and f is an integer inclusive of 0.

Preferably, R³ stands for substituted or unsubstituted monovalent hydrocarbon groups of 1 to 16 carbon atoms, especially 1 to 8 carbon atoms, and free of aliphatic unsaturation, for example, alkyl groups such as methyl, ethyl, propyl, butyl and octyl, cycloalkyl groups such as cyclohexyl, aryl groups such as phenyl and tolyl, and aralkyl groups such as benzyl and phenethyl, as well as substituted groups in which some or all of the hydrogen atoms on the foregoing groups are replaced by halogen atoms, cyano groups or the like, for example, haloalkyl groups such as chloropropyl and trifluoropropyl. Of these, methyl and phenyl are preferred for the industrial use.

The organohydrogenpolysiloxane preferably has a viscosity of about 1 to 500 centipoise, and especially about 1 to 100 centipoise at 25° C.

Components (A) and (B) are blended in such amounts that the ratio of the moles of hydrogen atoms directly attached to silicon atoms in the organohydrogenpolysiloxane to the moles of alkenyl groups in the both end alkenyl group-terminated organopolysiloxane, represented as H/Vi hereinafter, may range from 0.5/1 to 10/1, and especially from 1/1 to 4/1. With a H/Vi below 0.5, the primer composition will not fully cure. With a H/Vi beyond 10, the primer composition may degrade its adhesion with the lapse of time (referred to as aged adhesion).

On use, a platinum base curing catalyst (C) is added to the primer composition, which is cured by heating. The platinum base curing catalyst is preferably platinum or platinum base compounds. Exemplary platinum base compounds include platinum black, chloroplatinic acid, alcohol-modified chloroplatinic acid, and complexes of chloroplatinic acid with olefins, aldehydes, vinylsiloxanes and acetylene alcohols.

An appropriate amount of the platinum base curing catalyst is preferably about 1 to 500 parts, and especially about 5 to 100 parts by weight, calculated as platinum, per million parts by weight of the primer composition. Less than 1 ppm of platinum may fail to achieve the curing effects whereas more than 500 ppm may degrade the aged adhesion of the primer composition and is uneconomical.

Component (D) is a retarder for restraining the composition from reacting near room temperature. It may be selected from those compounds which are conventionally used in the addition reaction between an alkenyl-bearing polysiloxane and an organohydrogenpolysiloxane in the presence of a platinum base curing catalyst.

Useful reaction regulators include acetylene alcohols, vinyl-bearing siloxanes and silylated acetylene alcohols, as well as combinations of two or more reaction regulators as disclosed in JP-A 9-143371. Exemplary are 3-methyl-1-butyn-3-ol, 3,5-dimethyl-1-hexyn-3-ol, 3-methyl-1-penten-3-ol, 1-ethynylcyclohexanol, 1,1,3,3-tetramethyl-1,3-divinyl-disiloxane, methylvinylcyclotetrasiloxane, and 3-methyl-3-trimethylsiloxy-1-pentyne.

An appropriate amount of the reaction regulator blended is 0.01 to 10 parts, and especially 0.1 to 5 parts by weight per 100 parts by weight of components (A) and (B) combined. Less than 0.01 part would be too small to control the reaction whereas more than 10 parts would adversely affect cure.

In one preferred embodiment, the primer composition further includes (E) an organopolysiloxane having at least one epoxy group-containing organic group, at least one hydrogen atom, and at least one alkoxysilyl group-containing alkyl group, each directly attached to a silicon atom, in a molecule. This component is effective for further enhancing adhesion.

Preferred as component (E) are those of the following general formulas (5) and (6).

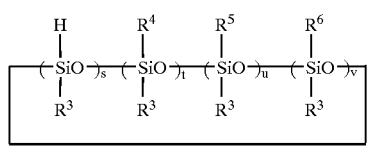
(5)

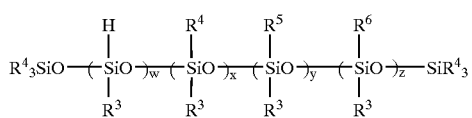
(6)

Herein, $R^3$ is as defined above. $R^4$ is hydrogen or $R^3$. $R^5$ is an epoxy group-containing organic group. $R^6$ is alkoxysilyl group-containing alkyl group. Each of s, u, v, w, y and z is an integer of at least 1, and each of t and x is 0 or an integer of at least 1.

The epoxy group-containing organic groups are exemplified by the following.

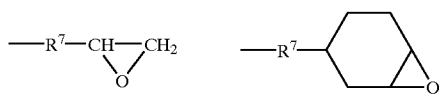

Herein $R^7$ is an alkylene group of 1 to 6 carbon atoms, preferably 2 to 4 carbon atoms, which may be separated by an oxygen atom, or an oxyalkylene group. Specific examples of the epoxy group-containing organic group are given below.

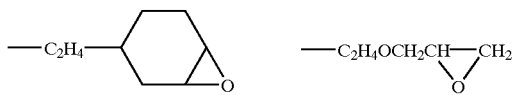

The alkoxysilyl group-containing alkyl groups are exemplified by the following.

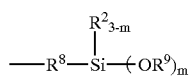

Herein $R^2$ is as defined above, $R^8$ is an alkylene group of 1 to 6 carbon atoms, preferably 2 to 4 carbon atoms, $R^9$ is an alkyl group of 1 to 6 carbon atoms, and m is an integer of 1 to 3, preferably 2 or 3. Specific examples of the alkoxysilyl group-containing alkyl group are given below.

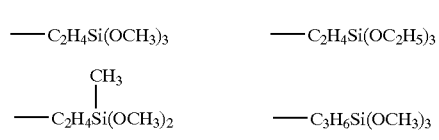

Illustrative, non-limiting, examples of component (E) are given below.

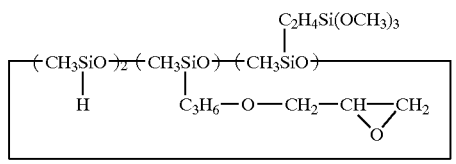

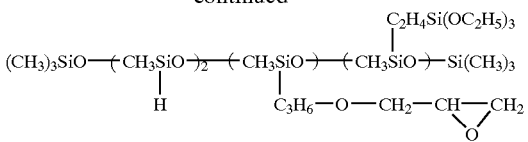

An appropriate amount of component (E) blended is 0.01 to 10 parts, and especially 0.1 to 1 part by weight per 100 parts by weight of components (A) and (B) combined. Less than 0.01 part of component (E) would be too small to enhance adhesion whereas more than 10 parts would adversely affect cure.

In another preferred embodiment, the primer composition further includes (F) at least one additive selected from among a fatty acid, an acid anhydride resulting from intermolecular condensation thereof, and an intramolecular acid anhydride thereof. This organic compound is also effective for enhancing the adhesion of the primer composition.

Exemplary additives are those of the following formulas (7) and (8).

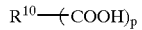
(7)

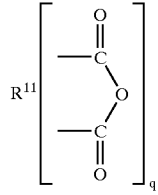
(8)

In the above formulas, $R^{10}$ is hydrogen or a saturated or unsaturated, substituted or unsubstituted, p-valent hydrocarbon group of 1 to 30 carbon atoms, and preferably 5 to 20 carbon atoms, and p is an integer of 1 to 10, and preferably 1 to 5. $R^{11}$ is a saturated or unsaturated, substituted or unsubstituted, 2q-valent hydrocarbon group of 1 to 30 carbon atoms, and preferably 2 to 20 carbon atoms, and q is an integer of 1 to 3.

The hydrocarbon groups represented by $R^{10}$ and $R^{11}$ include alkyl groups, aryl groups such as phenyl, aralkyl groups, combinations of these groups; divalent or more valent hydrocarbon groups in which a predetermined number of hydrogen atoms are eliminated from the foregoing monovalent hydrocarbon groups; substituted hydrocarbon groups in which hydrogen atoms on the foregoing hydrocarbon groups are replaced by halogen atoms or hydroxyl groups; and substituted hydrocarbon groups in which two hydrogen atoms attached to carbon atoms in an alkyl group are replaced by an oxygen atom, that is, having C=O.

Illustrative, non-limiting, examples of component (F) are given below.

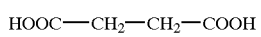

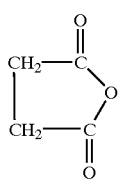
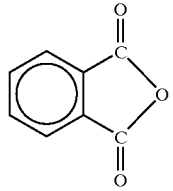

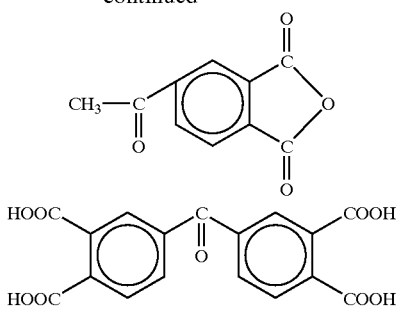

An appropriate amount of component (F) blended is 0.01 to 10 parts, and especially 0.1 to 1 part by weight per 100 parts by weight of components (A) and (B) combined. Less than 0.01 part of component (F) would be too small to enhance adhesion whereas more than 10 parts would adversely affect cure.

In order to apply the primer composition as a thin uniform coating, it is advantageous to blend an organic solvent in the primer composition. The type and amount of the organic solvent are determined by taking into account such factors as the ease of application of the resulting composition. Examples of the organic solvent include toluene, xylene, benzene, heptane, hexane, trichloro-ethylene, perchloroethylene, methylene chloride, ethyl acetate, and solvent gasoline. These solvents may be used alone or in admixture of two or more depending on the wetting of film backings with the resulting primer composition.

In applying the primer composition using the organic solvent, an alkenyl group-bearing polyorganosiloxane having a degree of polymerization of at least 3,000 may be added to the primer composition for further improving coating characteristics insofar as it does not compromise the benefits of the invention. When the alkenyl group-bearing polysiloxane is added, the amount of component (B) is increased if necessary.

Other optional components which can be added to the primer composition include well-known additives, for example, heat resistance improvers, coloring agents and antistatic agents, such as red iron oxide, cerium oxide, cerium hydroxide, titanium oxide, and carbon black. Such additives are included insofar as they do not compromise the benefits of the invention.

On use, the primer composition is prepared by uniformly mixing the above-mentioned components, then uniformly applied onto a plastic film, followed by heat curing. The coverage or buildup of the primer composition is a sufficient amount to form a thin primer film on the plastic film surface, for example, about 0.05 to 2.0 $g/m^2$. Application of an excessive amount rather impedes the adhesion of the silicone pressure-sensitive adhesive to the backing and is thus undesirable. After application, the primer coating is heated for curing. The temperature for heat curing may be selected as appropriate in the range from 80° C. for 120 seconds to 180° C. for 15 seconds although the curing conditions vary with the type of film backing and the coverage.

The plastic film backing to which the primer composition is applicable include polyester resins such as polyethylene terephthalate and polybutylene terephthalate, polyimide resins, polyimide ether resins, epoxy resins, phenolic resins, polyphenylene sulfide resins, ABS resins, and perfluoroalkoxy (PFA) resins.

The silicone pressure-sensitive adhesives which can be applied onto the primer include well-known adhesives, for example, adhesives of the peroxide curing type to be cured with organic peroxides, and adhesives of the addition curing type to be cured in the presence of platinum base catalysts at room temperature or elevated temperature. It is noteworthy and advantageous that the primer composition of the invention is compatible with silicone pressure-sensitive adhesives of the addition curing type.

The primer composition of the invention helps a silicone pressure-sensitive adhesive form a firm bond to a plastic film backing. The firm bond of the primer composition is fully durable for a time, that is, aged adhesion is good. The primer composition thus finds a wide variety of applications.

EXAMPLE

Examples of the invention are given below by way of illustration and not by way of limitation. All parts are by weight.

Examples 1–3 & Comparative Examples 1–4

Five primer compositions were obtained by mixing and agitating the following components at room temperature until uniform.

Example 1

Primer <1> included 100 parts of a diorganopoly-siloxane containing vinyl groups at both ends of its molecular chain (average degree of polymerization 900, vinyl group content 0.003 mol/100 g), 0.38 part of an organohydrogenpolysiloxane (hydrogen content 1.55 mol/100 g), 0.25 part of 1-ethynylcyclohexanol, 1,900 parts of n-hexane, and 100 ppm calculated as platinum of a platinum base catalyst (H/Vi=1.94).

Example 2

Primer <2> included 100 parts of a diorganopoly-siloxane containing vinyl groups at both ends of its molecular chain (average degree of polymerization 1300, vinyl group content 0.002 mol/100 g), 0.25 part of an organohydrogenpolysiloxane (hydrogen content 1.55 mol/100 g), 0.25 part of 1-ethynylcyclohexanol, 1,900 parts of n-hexane, and 100 ppm calculated as platinum of a platinum base catalyst (H/Vi=1.94).

Example 3

Primer <3> included 100 parts of a diorganopoly-siloxane containing vinyl groups at both ends of its molecular chain (average degree of polymerization 1300, vinyl group content 0.002 mol/100 g), 0.25 part of an organohydrogenpolysiloxane (hydrogen content 1.55 mol/100 g), 0.25 part of 1-ethynylcyclohexanol, 1,900 parts of n-hexane, 0.5 part of a compound of the following formula (9) as component (E), and 100 ppm calculated as platinum of a platinum base catalyst (H/Vi=1.94).

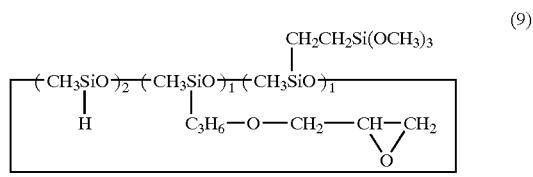

(9)

Comparative Example 1

Primer <4> included 100 parts of a diorganopoly-siloxane containing vinyl groups at both ends of its molecular chain (average degree of polymerization 450, vinyl group content 0.006 mol/100 g), 0.75 part of an organohydrogenpolysiloxane (hydrogen content 1.55 mol/100 g), 0.25 part of 1-ethynylcyclohexanol, 1,900 parts of n-hexane, and 100 ppm calculated as platinum of a platinum base catalyst (H/Vi=1.94).

Comparative Example 2

Primer <5> included 100 parts of a diorganopoly-siloxane containing vinyl groups at both ends of its molecular chain (average degree of polymerization 450, vinyl group content 0.006 mol/100 g), 0.75 part of an organohydrogenpolysiloxane (hydrogen content 1.55 mol/100 g), 0.25 part of 1-ethynylcyclohexanol, 1,900 parts of n-hexane, 0.5 part of the compound of the formula (9) as component (E), and 100 ppm calculated as platinum of a platinum base catalyst (H/Vi=1.94).

Comparative Example 3

Primer <6> included 100 parts of a diorganopoly-siloxane containing vinyl groups at both ends of its molecular chain and on side chains (average degree of polymerization 4,000, vinyl group content 0.002 mol/100 g), 0.25 part of an organohydrogenpolysiloxane (hydrogen content 1.55 mol/100 g), 0.25 part of 1-ethynylcyclohexanol, 1,900 parts of n-hexane, 0.5 part of the compound of the formula (9) as component (E), and 100ppm calculated as platinum of a platinum base catalyst (H/Vi=1.94).

Comparative Example 4

<7> means that no primer composition was used.

The above primer compositions were examined by the following tests. The plastic film backings used were strips of polyethylene terephthalate (PET) film and polyimide (PI) film of 25 μm thick which were slit to a width of 25 mm.

Two silicone pressure-sensitive adhesives were used.

A first adhesive was a mixture of 100 parts of an addition curing type silicone pressure-sensitive adhesive (trade name: X-40-3103 by Shin-Etsu Chemical Co., Ltd.), 0.5 part of a platinum base catalyst (trade name: CAT-PL-50T by Shin-Etsu Chemical Co., Ltd.) and 50 parts of toluene, which could be applied onto a film backing and heated at 120° C. for 2 minutes for curing to give a pressure-sensitive adhesive tape.

A second adhesive was a mixture of 100 parts of a peroxide curing type silicone pressure-sensitive adhesive (trade name: KR120 by Shin-Etsu Chemical Co., Ltd.), 1.2 parts of benzoyl peroxide and 50 parts of toluene, which could be applied onto a film backing, air dried for 30 minutes, and heated at 150° C. for 5 minutes for curing to give a pressure-sensitive adhesive tape.

The primer composition was applied onto the plastic film strip using a wire bar #8, heat cured at 120° C. for one minute, and allowed to stand for 4 hours. The silicone pressure-sensitive adhesive was then applied onto the primed strip so as to give a dry thickness of 40 μm and cured according to its appropriate procedure. An adhesive tape sample was prepared in this way.

Adhesion was examined by cutting the 25 mm wide film backing of the tape sample along a line spaced 2 mm from the side, tearing off the cut section, pulling the sample at both ends in opposite directions, and observing whether the adhesive layer was separated apart from the film backing. Under the "Peeling" heading, the sample was rated "Reject" when the adhesive layer was separated apart over the entire area, "Fair" when the adhesive layer was partially separated, and "Pass" when no separation was observed.

Elongation was examined by cutting only the film backing of the tape sample, and pulling the sample at both ends in opposite directions. The elongation of the adhesive layer until breakage was measured. As the adhesion is better, the elongation of the adhesive layer is shorter.

Aged adhesion was examined by applying and curing the primer, holding the primer coating in air at room temperature for one day, and rubbing the primer coating with the finger prior to application of the adhesive. The primer was rated "Reject" when the coating was crumbled away by rubbing, "Fair" when the coating was partially crumbled away, and "Pass" when no crumbling was observed.

The results are shown in Table 1.

TABLE 1

|  | Example | | | Comparative Example | | | |
|---|---|---|---|---|---|---|---|
|  | 1 | 2 | 3 | 1 | 2 | 3 | 4 |
| Adhesive | Addition curing type X-40-3103 | | | | | | |
| Primer | <1> | <2> | <3> | <4> | <5> | <6> | <7> |
| Peeling | | | | | | | |
| PET | Pass | Pass | Pass | Reject | Reject | Fair | Reject |
| PI | Pass | Pass | Pass | Reject | Reject | Fair | Reject |
| Elongation (mm) | | | | | | | |
| PET | 5 | 0 | 0 | 70 | 40 | 20 | 150 |
| PI | 5 | 0 | 0 | 60 | 40 | 20 | 150 |
| Aged adhesion | | | | | | | |
| PET | Fair | Fair | Pass | Reject | Reject | Pass | Reject |
| PI | Fair | Fair | Pass | Reject | Reject | Pass | Reject |
| Adhesive | Peroxide curing type KR120 | | | | | | |
| Primer | <1> | <2> | <3> | <4> | <5> | <6> | <7> |
| Peeling | | | | | | | |
| PET | Pass | Pass | Pass | Reject | Reject | Fair | Reject |
| PI | Pass | Pass | Pass | Reject | Reject | Fair | Reject |
| Elongation (mm) | | | | | | | |
| PET | 5 | 0 | 0 | 60 | 30 | 20 | 130 |
| PI | 5 | 0 | 0 | 40 | 30 | 20 | 130 |
| Aged adhesion | | | | | | | |
| PET | Fair | Fair | Pass | Reject | Reject | Pass | Reject |
| PI | Fair | Fair | Pass | Reject | Reject | Pass | Reject |

Example 4 & Comparative Examples 5–6

Two primer compositions were prepared by mixing and agitating the following components at room temperature until uniform.

Example 4

Primer <8> included 100 parts of a diorganopoly-siloxane containing vinyl groups at both ends of its molecular chain (average degree of polymerization 1,300, vinyl group content 0.002 mol/100 g), 0.25 part of an organohydrogenpolysiloxane (hydrogen content 1.55 mol/100 g), 0.25 part of 1-ethynylcyclohexanol, 1,900 parts of n-hexane, 0.2 part of a compound of the following structural formula (10) as component (F), and 100 ppm calculated as platinum of a platinum base catalyst (H/Vi=1.94).

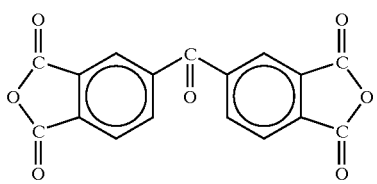

(10)

Comparative Example 5

Primer <9> included 100 parts of a diorganopoly-siloxane containing vinyl groups at both ends of its molecular chain (average degree of polymerization 450, vinyl group content 0.006 mol/100 g), 0.75 part of an organohydrogenpolysiloxane (hydrogen content 1.55 mol/100 g), 0.25 part of 1-ethynylcyclohexanol, 1,900 parts of n-hexane, 0.2 part of the compound the formula (10) as component (F), and 100 ppm calculated as platinum of a platinum base catalyst (H/Vi=1.94).

Comparative Example 6

<10> means that no primer composition was used.

The above primer compositions were examined by the same tests as in Examples 1 to 3. The plastic film backings used were strips of polyphenylene sulfide (PPS) film, polyethylene terephthalate (PET) film and polyimide (PI) film of 25 μm thick which were slit to a width of 25 mm.

The silicone pressure-sensitive adhesive used was a mixture of 100 parts of an addition curing type silicone pressure-sensitive adhesive (trade name: X-40-3103 by Shin-Etsu Chemical Co., Ltd.), 0.5 part of a platinum base catalyst (trade name: CAT-PL-50T by Shin-Etsu Chemical Co., Ltd.) and 50 parts of toluene, which could be applied onto a film backing and heated at 120° C. for 2 minutes for curing to give a pressure-sensitive adhesive tape.

The results are shown in Table 2.

TABLE 2

|  | Example | Comparative Example | |
| --- | --- | --- | --- |
|  | 4 | 5 | 6 |
| Adhesive | Addition curing type X-40-3103 | | |
| Primer | <8> | <9> | <10> |
| Peeling |  |  |  |
| PET | Pass | Fair | Reject |
| PI | Pass | Fair | Reject |
| PPS | Pass | Fair | Reject |
| Elongation (mm) |  |  |  |
| PET | 0 | 10 | 150 |
| PI | 0 | 10 | 150 |
| PPS | 0 | 20 | 250 |
| Aged adhesion |  |  |  |
| PET | Pass | Reject | Reject |
| PI | Pass | Reject | Reject |
| PPS | Pass | Reject | Reject |

It is evident from Tables 1 and 2 that the primer compositions within the scope of the invention are effective for improving the adhesion between various plastic films and silicone pressure-sensitive adhesives.

Japanese Patent Application No. 2000-082938 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A pressure-sensitive adhesive tape comprising a plastic film, a primer film formed by applying a primer composition onto the plastic film, followed by heat curing, and a silicone pressure-sensitive adhesive layer thereon, said primer composition comprising:
    (A) a diorganopolysiloxane having alkenyl groups at both ends of its molecular chain and an average degree of polymerization of 500 to 2,000, wherein the amount of alkenyl groups being 0.001 to 0.005 mol per 100 g of the diorganopolysiloxafle,
    (B) an organohydrogenpolysiloxane having at least two hydrogen atoms directly attached to silicon atoms in a molecule,
    (C) a platinum base curing catalyst, and
    (D) a retarder.

2. A pressure-sensitive adhesive tape comprising a plastic film, a primer film formed by applying a primer composition onto the plastic film, followed by heat curing, and a silicone pressure-sensitive adhesive layer thereon, said primer composition comprising:
    (A) a diorganopolysiloxane having alkenyl groups at both ends of its molecular chain and an average degree of polymerization of 500 to 2,000, wherein the amount of alkenyl groups being 0.001 to 0.005 mol per 100 g of the diorganopolysiloxane,
    (B) an organohydrogenpolysiloxane having at least two hydrogen atoms directly attached to silicon atoms in a molecule,
    (C) a platinum base curing catalyst,
    (D) a retarder,
    (E) an organopolysiloxane having at least one epoxy group-containing organic group, at least one hydrogen atom, and at least one alkoxysilyl group-containing alkyl group, each directly attached to a silicon atom, in the organopolysiloxane molecule, and
    (F) at least one additive selected from the group consisting of a fatty acid, an acid anhydride resulting from intermolecular condensation of the fatty acid, and an intramolecular acid anhydride of the fatty acid.

3. The pressure-sensitive adhesive tape of claim 1, wherein said diorganopolysiloxane is of formula (1):

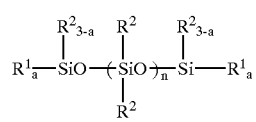

(1)

wherein $R^1$ is alkenyl, $R^2$ is a substituted or unsubstituted monovalent hydrocarbon group, a is an integer of 1 to 3, and n is from 500 to 2,000.

4. The pressure-sensitive adhesive tape of claim 3, wherein $R^1$ is an alkenyl group of 2 to 8 carbon atoms, and $R^2$ is a substituted or unsubstituted monovalent hydrocarbon group of 1 to 16 carbon atoms.

5. The pressure-sensitive adhesive tape of claim 3, wherein $R^2$ is a substituted or unsubstituted monovalent hydrocarbon group of 1 to 8 carbon atoms.

6. The pressure-sensitive adhesive tape of claim 3, wherein $R^2$ is selected from the group consisting of methyl and phenyl.

7. The pressure-sensitive adhesive tape of claim 3, wherein the diorganopolysiloxane having alkenyl groups at both ends of its molecular chain represented by formula (1) has an average degree of polymerization of 1,000 to 2,000 and the amount of alkenyl groups is from 0.001 to 0.0025 mol per 100 g of the diorganopolysiloxane.

8. The pressure-sensitive adhesive tape of claim 1, wherein the organohydrogenpolysiloxane (B) is represented any one of the following general formulas (2) to (4):

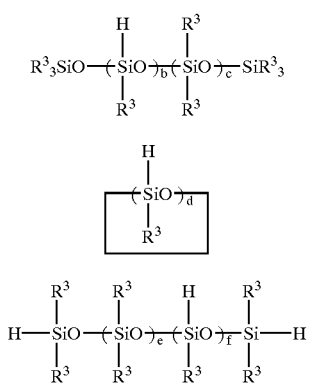

wherein in each of said formulae (2), (3) and (4), $R^3$ is a substituted or unsubstituted monovalent hydrocarbon group, b is an integer of at least 2, d is an integer of at least 3, and each of c, e and f is an integer inclusive of 0.

9. The pressure-sensitive adhesive tape of claim 8, wherein $R^3$ is a substituted or unsubstituted monovalent hydrocarbon group of 1 to 16 carbon atoms and free of aliphatic unsaturation.

10. The pressure-sensitive adhesive tape of claim 8, wherein $R^3$ is a substituted or unsubstituted monovalent hydrocarbon group of 1 to 8 carbon atoms and free of aliphatic unsaturation.

11. The pressure-sensitive adhesive tape of claim 1, wherein the organohydrogenpolysiloxane has a viscosity of about 1 to 500 centipoise at 25° C.

12. The pressure-sensitive adhesive tape of claim 1, wherein the organohydrogenpolysiloxane has a viscosity of about 1 to 100 centipoise at 25° C.

13. The pressure-sensitive adhesive tape of claim 1, wherein the diorganopolysiloxane (A) and organohydrogenpolysiloxane (B) are blended in such amounts that the ratio of the moles of hydrogen atoms directly attached to silicon atoms in the organohydrogenpolysiloxane (B) to the moles of alkenyl groups in the diorganopolysiloxane (A) range from 0.5/1 to 10/1.

14. The pressure-sensitive adhesive tape of claim 1, wherein the diorganopolysiloxane (A) and organohydrogenpolysiloxane (B) are blended in such amounts that the ratio of the moles of hydrogen atoms directly attached to silicon atoms in the organohydrogenpolysiloxane (B) to the moles of alkenyl groups in the diorganopolysiloxane (A) range from 1/1 to 4/1.

15. The pressure-sensitive adhesive tape of claim 1, wherein the platinum base compound (C) is present in an amount of 1 to 500 parts by weight of platinum per million parts by weight of the primer composition.

16. The pressure-sensitive adhesive tape of claim 1, wherein the platinum base compound (C) is present in an amount of 5 to 100 parts by weight of platinum per million parts by weight of the primer composition.

17. The pressure-sensitive adhesive tape of claim 1, wherein the retarder is present in an amount of 0.01 to 10 parts by weight per 100 parts by weight of components (A) and (B) combined.

* * * * *